United States Patent [19]

Nielsen et al.

[11] 4,182,744

[45] Jan. 8, 1980

[54] EXTRACTING COLUMBIUM-TANTALUM VALUES FROM PYROCHLORE ORES

[75] Inventors: Ralph H. Nielsen; Patrick H. Payton, both of Albany, Oreg.

[73] Assignee: Teledyne Industries, Inc., Los Angeles, Calif.

[21] Appl. No.: 929,545

[22] Filed: Aug. 4, 1978

[51] Int. Cl.$^2$ .............................................. C01G 33/00
[52] U.S. Cl. ........................................ 423/68; 423/62; 75/101 R; 75/121
[58] Field of Search .................. 423/62, 68; 75/97 R, 75/101 R, 121

[56] References Cited

U.S. PATENT DOCUMENTS

| | | | |
|---|---|---|---|
| 1,905,882 | 4/1933 | Balke | 423/66 |
| 2,880,060 | 3/1959 | Campbell et al. | 423/68 |
| 3,025,157 | 3/1962 | Lerner | 423/68 |
| 3,107,976 | 10/1963 | Koerner et al. | 423/68 |
| 3,607,006 | 9/1971 | Stambaugh | 423/68 |

Primary Examiner—Herbert T. Carter
Attorney, Agent, or Firm—Shoemaker and Mattare, Ltd.

[57] ABSTRACT

A method of extracting high purity columbium oxide, also known as niobium oxide, from barium-rich pyrochlore ores by treating the ore with a calcium salt such as calcium chloride, fusing the ore with caustic soda and a fluorine containing compound, and subsequently acid leaching the fused mass; and from calcium-rich pyrochlore ores by fusing the ore with caustic soda and a fluorine containing compound, and subsequently acid leaching the fused mass. The amount of fluorine containing compound used should contain anywhere from above 2% to about 10% fluorine content by weight relative to the ore.

10 Claims, No Drawings

EXTRACTING COLUMBIUM-TANTALUM VALUES FROM PYROCHLORE ORES

BACKGROUND OF THE INVENTION

1. Field of the Invention

This invention relates to a method of recovering high purity columbium oxide from pyrochlore ores. More specifically, it deals with the obtaining of columbium oxide from barium-rich and calcium-rich pyrochlore ores.

2. Description of the Prior Art

How to obtain columbium and tantalum values from pyrochlore ores is well known. These processes are usually drawn to the production of ferro-columbium, which is subsequently used in that state for such purposes as additions to metal alloys. It is also possible to obtain columbium oxide values by a caustic fusion process from certain pyrochlore ores found in Canada. These oxides, however, are not easily available in any measure of purity from other pyrochlore ores of a barium-rich nature, such as those found in Brazil. Although the metal oxides are obtainable in relatively large yields from those ores, they are of a purity of about 80-85%, which is unacceptable for most purposes. By barium-rich pyrochlore ores, we mean those whose barium content is from 2 to 20% by weight, and whose calcium content is lower, generally less than 2% by weight. Calcium rich pyrochlore ores usually have greater than 2% and as much as 20% calcium content by weight. The impurities consist mainly of barium and calcium, along with smaller amounts of titanium, zirconium, rare earths, uranium, and thorium. These impurities, which for the main part are calcium and barium, are so tied up with the columbium oxide that the product produced is unsatisfactory as it exists for most uses.

In view of the fact that columbium is becoming a more important refractory metal and is being used for such items as jet engine exhausts, high temperature alloys, rocket nozzles, and superconductors, it is now in industry's interest to be able to produce high purity columbium oxide in increasingly larger amounts. In view of the above, and in light of the fact that there are large sources of pyrochlore ore having a high content of barium, there is a need to find a process to produce high purity columbium oxide from this type of ore.

BRIEF SUMMARY OF THE INVENTION

1. Objects of the Invention

It is, accordingly, one object of the present invention to provide a new process for producing high purity columbium oxide from barium-rich pyrochlore ores.

An additional object of the invention is to set forth a process whereby the pyrochlore ore is first treated with a calcium salt, such as calcium chloride, fused with an alkali metal fluoride, ammonium fluoride, alkaline earth fluoride, or a fluosilicate and caustic soda, and subsequently acid leached to produce a high yield of high purity columbium oxide.

Another object of the present invention is to provide a process whereby a calcium-rich pyrochlore ore is fused with caustic soda and from above 2% to about 10% fluorine content by weight relative to the ore of a fluorine compound at temperatures from 550-1000° C. for from several minutes to one hour and subsequently leached with hydrochloric acid to produce columbium oxide of a purity of from 88-95%.

These and other advantages of the present invention will be apparent from the following detailed description and examples.

In accordance with the above objects, it has been found that high purity, high yield columbium oxide can be produced from pyrochlore ore having a high content of barium, by treating the ore with calcium chloride, fusing with a fluorine-containing compound, and caustic soda followed by acid leach. The barium-rich ore is first treated with calcium chloride to exchange calcium for barium, the now calcium-rich ore is fused with caustic soda and a fluorine containing compound, and subsequently leached with acid to produce a high purity product. By this process, three-fourths of the impurities are removed as opposed to ordinary process, which removes about one-half of the impurities, the later process producing a product which is not usable for most industrial uses of columbium. It has further been found that temperatures, time, atmosphere and amount of caustic do not substantially affect the degree of purity of the product within the ranges specified herein. The fluorine content, however, does affect this factor as the amount is increased over a particular range. This range is anywhere from above 2% to about 10% by weight of the ore.

DESCRIPTION OF THE PREFERRED EMBODIMENTS

In accordance with the present invention, there has been found a new process of treating pyrochlore ores rich in barium to produce high purity, high yield columbium oxide. This process involves treating the barium-rich pyrochlore ore with a calcium salt such as calcium chloride at about 1000° C. to produce a calcium rich ore. This calcium rich ore is now fused with caustic soda and an alkali metal fluoride or alkaline earth fluoride, and finally leached with acid to produce columbium oxide having a purity of from 88-95% and a recovery of above 90%.

The reaction is carried out at a temperature of 550-1000° C. The preferred temperature is about 750° C.

The amount of caustic soda used is anywhere from at least 2:1 by weight of caustic soda to ore, respectively, and preferably about 2.5:1. The amount of fluorine containing compound contains from above 2% to about 10% fluorine by weight relative to the ore, and the reaction is carried out in air, although it is possible and sometimes efficacious to use a nitrogen atmosphere.

The fluorine containing compound preferably is calcium fluoride, however, this can be substituted by ammonium fluoride, alkali metal fluorides, other alkaline earth fluorides, and fluosilicates.

The acid leach can be performed with hydrochloric acid or nitric acid.

The following examples were made to illustrate the process of the present invention. These examples are shown in Table 1 below. The procedure followed for the preparation of these examples is as follows.

Eleven 20.0 gram samples of calcium chloride treated pyrochlore (making it calcium-rich) were placed in 150 ml iron crucibles with the amounts of caustic soda and calcium fluoride specified in Table 1. The mixtures were then fused in a muffle furnace at the temperature and time specified in Table 1. The crucibles were removed from the muffle furnace. When the fusion mixture was cooled enough, it was water leached with 800 ml of water heated to a boil, and subsequently filtered.

This filter cake was then leached with 400 ml of water at room temperature and subsequently filtered. This filter cake was then leached with 250 ml of 2.5 N hydrochloric acid heated to 90° C. and subsequently filtered. The filter cake was then leached a second time with 250 ml of 2.5 N hydrochloric acid and again filtered. The filter cake was subsequently dried at 150° C. for four hours and then fired at 500° C. for 8–12 hours.

TABLE 1

| Example | Caustic:Ore | Temp. °C. | $F^-$ (wt. % Ore) | Time (Min.) | Oxide Purity, % | Recovery, % |
|---|---|---|---|---|---|---|
| 1 | 2.5:1 | 650 | 4.16 | 40 | 93.9 | 84.1 |
| 2 | 2:1 | 750 | 6.23 | 20 | 92.3 | 87.1 |
| 3 | 2:1 | 550 | 2.07 | 20 | 92.5 | 94.4 |
| 4 | 3:1 | 750 | 6.23 | 60 | 92.4 | 86.3 |
| 5 | 3:1 | 750 | 2.07 | 20 | 85.7 | 92.6 |
| 6 | 2.5:1 | 650 | 4.16 | 40 | 93.8 | 95.9 |
| 7 | 3:1 | 550 | 2.07 | 60 | 85.6 | 89.5 |
| 8 | 2:1 | 750 | 2.09 | 60 | 86.1 | 94.8 |
| 9 | 2:1 | 550 | 6.23 | 60 | 92.4 | 95.2 |
| 10 | 3:1 | 550 | 6.33 | 20 | 94.7 | 80.9 |
| 11 | 2.5:1 | 650 | 4.16 | 40 | 93.3 | 83.8 |

The percentage recovery values shown in Table 1 are somewhat low because of the small amounts of ore used in this particular set of experiments. As the amount of ore used in the fusion is increased, the gravimetric errors from material loss due to handling procedures are minimized and the percentage recovery is usually greater than 95%. To illustrate this, several fusions were made on a larger scale than those in Table 1.

For instance, four pounds of calcium chloride treated pyrochlore (making it calcium-rich) was fused with twelve pounds of caustic soda and 0.32 pounds $CaF_2$ in a one-gallon steel pot in a gas fired kiln. The mixture was placed in the pot and placed into the top-loading kiln, which was then lit and brought to a temperature of 740° C. The temperature was held for one hour while constantly stirring the fusion mixture with a pneumatically actuated iron stirring paddle. It was noted that the reaction is completed in several minutes, probably less than five. The iron pot was lifted from the kiln, and the fusion mass was poured onto a steel pan to cool. The solid, cooled fusion mass was then broken into pieces and put into 20 gallons of water in a 30 gallon polyethylene tank and stirred until all the lumps were broken and a smooth mixture was obtained. This was allowed to settle, and 15 gallons of water were decanted and replaced with 10 gallons of fresh water. Stirring was continued for approximately one hour, and the mixture was allowed to settle again. The clear supernatent was decanted and the remainder of the material was filtered through GF/A filter paper in a Buchner funnel. This filter cake was slurried with 16 liters of 3 N hydrochloric acid, which was brought to a boil and held at that temperature for one-half hour. The mixture was then filtered through GF/A filter paper, dried at 150° C., and fired at 800° C. for five hours. The fired weight of the final $Nb_2O_5$ product was 1288 grams, and the product was analyzed in duplicate as 89.4% and 89.1% $Cb_2O_5$.

As the original ore analyzed at 64.02% $Cb_2O_5$, this is a niobium recovery of 98.9%.

Using the same procedure, two other examples had the following results:

|  | Oxide Purity | Columbium Recovery |
|---|---|---|
| LCF-10 | 91.3% | 96.1% |
| LCF-12 | 88.8% | 100.5% |

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the mete and bounds of the claims or that form their functional as well as conjointly cooperative equivalent are, therefore, intended to be embraced by those claims.

What we claim is:

1. A method of extracting high purity columbium oxide from calcium rich pyrochlore ores comprising fusing the ore with caustic soda and an inorganic fluorine containing compound, said fluorine containing compound being present in an amount of from above 2% to 10% fluorine content by weight of the ore, and subsequently acid leaching the fused mixture with an inorganic acid.

2. A method of extracting high purity columbium oxide from barium rich pyrochlore ores comprising treating the ore with calcium chloride at about 1000° C. and subsequently fusing the ore with caustic soda and an inorganic fluorine containing compound, said fluorine containing compound being present in an amount of from above 2% to 10% fluorine content by weight of the ore, and subsequently acid leaching the fused mixture with an inorganic adic.

3. A method according to claims 1 or 2 wherein the fluorine containing compound is selected from the group consisting of ammonium fluoride, alkali metal fluoride, alkaline earth fluoride, and fluosilicates.

4. A method according to claim 3 wherein the fluorine containing compound is calcium fluoride.

5. A method according to claims 1 or 2 wherein the fusion takes place at a temperature of from 550° to 1000° C.

6. A method according to claim 5 wherein the fusion takes place at 750° C.

7. A method according to claims 1 or 2 wherein the caustic soda is present in a ratio of from at least 2:1 caustic soda to ore, respectively.

8. A method according to claim 7 wherein the caustic soda is present in a ratio of 2.5:1 with respect to the ore.

9. A method according to claims 1 or 2 wherein the fusion is performed in a nitrogen atmosphere.

10. A method according to claims 1 or 2 wherein the acid leaching is made with an acid selected from the group comprising of hydrochloric and nitric.

* * * * *